June 21, 1966  W. KARSTEN ETAL  3,257,257

SEAM WELDING APPARATUS

Filed Sept. 12, 1963

United States Patent Office 3,257,257
Patented June 21, 1966

3,257,257
SEAM WELDING APPARATUS
Werner Karsten, Sprendlingen, and Heinrich Kessler, Frankfurt am Main, Germany, assignors to Thomas Josef Heimbach G.m.b.H. & Co., Duren, Germany
Filed Sept. 12, 1963, Ser. No. 308,499
Claims priority, application Germany, Sept. 15, 1962, B 68,869
3 Claims. (Cl. 156—498)

This invention relates to an apparatus for the continuous seam welding of thermoplastic sheets and films.

Thermoplastic films are used for a steadily widening range of applications; these, however, often require a particular finishing of the films for which the available devices are not suitable. For certain applications, endless films are desired which have a width different from the width of the films which are commercially available. In order to obtain the desired width lengths of such commercially available films have to be joined first along their length, whereupon their free ends are then heat sealed together. In such endless films made with conventional heat sealing means, the thickness of the longitudinal seam differs from that of the film, which is often objectionable.

It is a principal object of the invention to provide an apparatus for welding thermoplastic sheets or films in such a way that the seam does not form a ridge but has the same thickness as the film.

Other objects and advantages will be apparent from a consideration of the specification and claims.

The apparatus of the invention uses the so-called heat contact method. The two longitudinally overlapping films are guided between an endless band of Teflonized glass fabric or the like and a wide endless metal band. A continuously heated welding roll is urged against the metal band and supplies the heat required for the welding to said metal band and thereby to the films in contact with said band. Laterally of the support of said welding roll, follower rolls are arranged laterally of the path of the metal band in such a way that their rolling surfaces are displaced downwardly by the thickness of the metal band so that said contact surfaces are at the same level as the lower surface of the metal band. A cooling roll may be provided behind the welding roll to cool the heated metal band.

Figure 1:
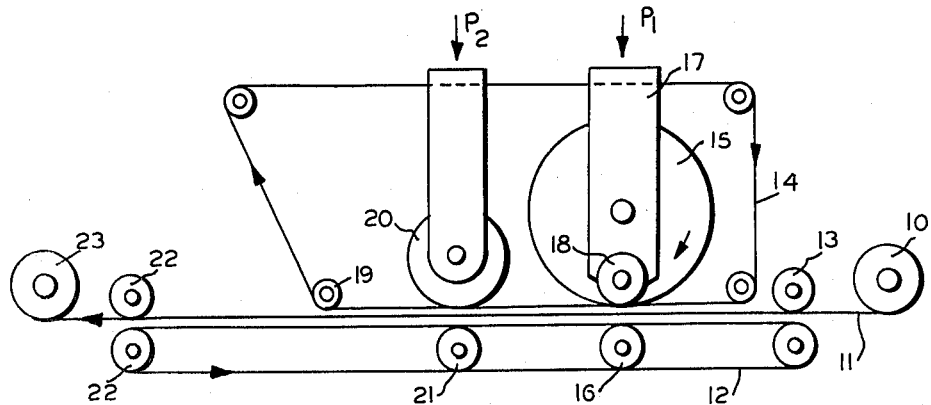
Figure 2:
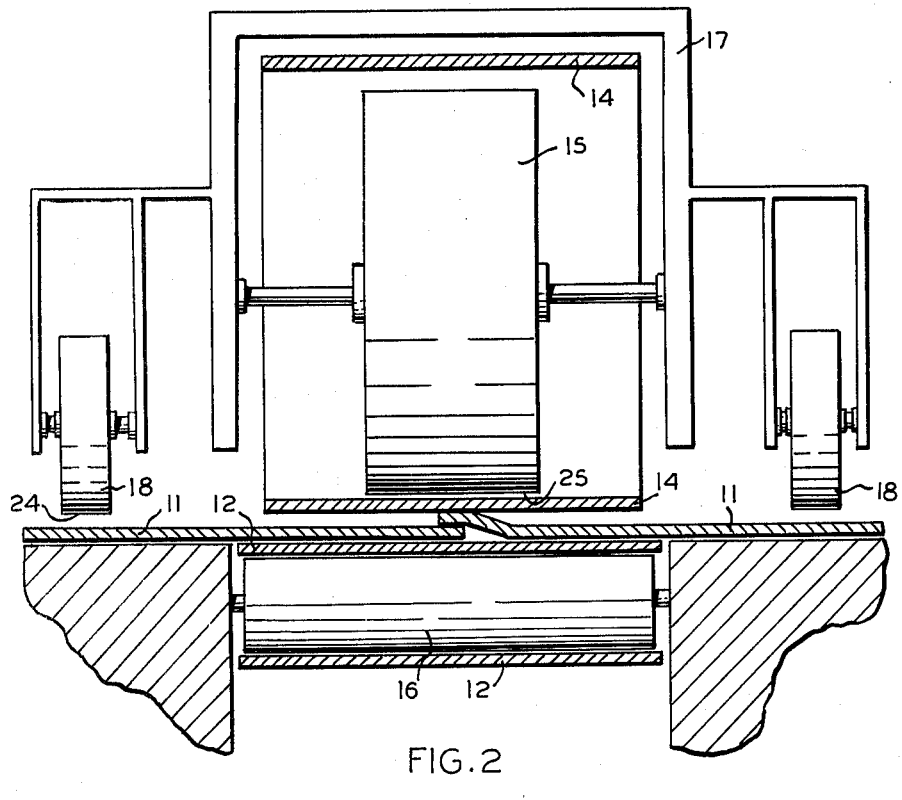

A preferred embodiment of the invention is shown in the accompanying drawing wherein:

FIG. 1 is an elevational view of the machine, and
FIG. 2 represents a cross section on the line A—A of FIG. 1.

Referring now to the drawing, two thermoplastic films 11 to be joined pass from two supply reels, which can be braked, to a table in the centre of which passes a conveyor belt 12 driven by a motor (not shown). The belt consists of a glass fabric impergnated or coated with polytetrafluoethylene or silicone rubber and passes the films, which overlap by about 2 mm., at a rate of about 1 m./min. below an endless metal band 14 which consists of spring steel (6.5 mm. wide, 0.2 mm. thick) the ends of which are hard-soldered together. A narrower welding roll 15, heated at about 190° C., is urged by a load P, against the steel band 14. Steel band, films and conveyor belt are supported by a supporting roll 16 of heat insulating material. The contact pressure produced by the weight P, causes that the steel band is entrained by the films and that the welding roll rolls on the steel band. The pressure required depends on the temperature of the welding roll, the rate of passage of the films, and the tension at which the films are pulled off the supply rolls.

The welding roll heats up the steel band whereby a laterally extending temperature gradient is produced. Said temperature gradient, together with the pressure exerted by the welding roll on the film, causes an undiscernible transition of the welding seam into the film. In order to accomplish a smooth transition from the one film to the other, we have found that it is not only important to heat the films at their overlap to the melting point so as to produce an autogenous bond but the films should also be heated at the farther surroundings of the weld so far as to become there plastic. We have further observed that the joined films after welding had become somewhat broader than the juxtaposed and partially overlapping films prior to the welding.

The apparatus as described so far does not yet allow to obtain a consistently even thickness of the seam. Rather, the thickness is sometimes somewhat above and at other times somewhat below the desired value. As a result, the seam is slightly corrugated. This drawback is avoided by providing follower rolls 18 laterally at the support 17 of the welding roll 15 alongside the path of the steel band. With respect to the contact surface 25 of the welding roll 15, the contact surfaces 24 of said rolls 18 are displaced downwardly by the amount of the thickness of the endless metal band 14.

The use of heated metal parts, especially steel bodies, as heat and pressure applying elements has generally the drawback that the thermoplastic material tends to adhere to said elements. It is, therefore, common practice to place polytetrafluoethylene or silicone rubber layers between the thermoplastic material and the heat and pressure applying elements.

In our machine, the interposition of such a protective layer or separating film is not necessary because the welding portion of the steel band continues its travel together with the film and thereby cools down so far that the thermoplastic material in the underlying seam solidifies again and does not longer adhere to the steel band. Subsequently, the steel band is lifted over guide rollers and returned.

In order to shorten the travel of the steel band required for said cooling, a water cooled roll 20 rolls on the steel band behind the welding roll. Said cooling roll is preferably loaded with a weight $P_2$. It is as wide as the steel band which, together with the film and the conveyor band, is supported below the cooling roll by a supporting roll 21. The supporting rolls 21 and 16 can be replaced by a single table. At the place of the supporting roller 16, such table would have in insert of heat insulating material, for instance a resin plate coated with a phenolic resin, in order to prevent heat transmission to other parts of the table plate which may be made of iron.

After the spring steel band has been lifted from the film, the latter passes between two rollers 22, the lower of which serves as guide roller for the endless conveyor belt. Said rollers and the brakes acting on the supply reel determine the traction acting on the films paid out from the reel in order to prevent distortion of the film in the heating zone. Subsequently, the welded film is wound up on a collecting roll or reel 23.

If required, the operating speed of the machine can be considerably increased by replacing the lower Teflon band by a further metal band which cooperates with a second welding roller.

It is to be understood that the foregoing detailed description is given merely by way of illustration and that many variations may be made therein without departing from the spirit of our invention.

We claim:
1. A heat sealing apparatus comprising two endless bands traveling part of their lengths at equal speed in the same direction in parallel closely spaced superposed relationship so as to advance between themselves two juxtaposed films of thermoplastic material, the contacting longitudinal edges of said films overlapping each other, at least one of said endless bands being a metal band, a heated welding roll contacting said metal band in the area of said overlapping film edges, means urging said roll against said band so as to weld the overlapping edges of said film, and one roller each at either side of said welding roll and parallel thereto, said rollers being disposed laterally of said metal band for direct contact with said films.

2. The apparatus as claimed in claim 1 comprising a cooling roller contacting said metal band in the direction of travel behind said welding roll.

3. The apparatus as claimed in claim 1 wherein the endless band not contacted by said heated roll consists of a glass fabric coated with polytetrafluoethylene.

References Cited by the Examiner
UNITED STATES PATENTS 2,451,728   10/1948   Gardner et al. _____ 100—93

EARL M. BERGERT, *Primary Examiner.*

DOUGLAS J. DRUMMOND, *Assistant Examiner.*